United States Patent
Kim et al.

(10) Patent No.: US 10,334,321 B2
(45) Date of Patent: Jun. 25, 2019

(54) DISPLAY APPARATUS AND METHOD FOR ACQUIRING CHANNEL INFORMATION OF A DISPLAY APPARATUS

(71) Applicant: SAMSUNG ELECTRONICS CO., LTD., Suwon-si (KR)

(72) Inventors: Myung-jae Kim, Suwon-si (KR); Ji-hun Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/833,615

(22) Filed: Dec. 6, 2017

(65) Prior Publication Data

US 2018/0167694 A1 Jun. 14, 2018

(30) Foreign Application Priority Data

Dec. 8, 2016 (KR) .................. 10-2016-0166672

(51) Int. Cl.
| H04N 21/482 | (2011.01) |
| H04N 21/44 | (2011.01) |
| H04N 21/8405 | (2011.01) |
| H04N 21/422 | (2011.01) |
| H04N 21/434 | (2011.01) |
| H04N 21/438 | (2011.01) |
| H04N 21/462 | (2011.01) |

(52) U.S. Cl.
CPC ... *H04N 21/4828* (2013.01); *H04N 21/42203* (2013.01); *H04N 21/4345* (2013.01); *H04N 21/4383* (2013.01); *H04N 21/44008* (2013.01); *H04N 21/4622* (2013.01); *H04N 21/4821* (2013.01); *H04N 21/8405* (2013.01)

(58) Field of Classification Search
None
See application file for complete search history.

(56) References Cited

U.S. PATENT DOCUMENTS

| 8,972,267 B2 | 3/2015 | Yeh et al. |
| 9,525,910 B2 | 12/2016 | Lee et al. |

(Continued)

FOREIGN PATENT DOCUMENTS

| JP | 2008-61191 A | 3/2008 |
| KR | 10-2009-0029356 A | 3/2009 |

(Continued)

OTHER PUBLICATIONS

Communication dated Apr. 18, 2018, issued by the European Patent Office in counterpart European application No. 17200263.6.

*Primary Examiner* — Alexander Q Huerta
(74) *Attorney, Agent, or Firm* — Sughrue Mion, PLLC

(57) ABSTRACT

A display apparatus includes an input interface that receives a user input for selecting a channel, a tuner that receives a broadcast signal corresponding to the channel, a display that displays a content included in the broadcast signal, a storage configured to store channel information obtained from the broadcast signal, a communicator configured to communicate with an external apparatus, and a controller that selects a channel based on the user input, displays content corresponding to the changed channel on the display, acquires a channel number, a source ID and a channel name with respect to the channel, and transmits the channel number, the source ID and the channel name to a server.

12 Claims, 13 Drawing Sheets

(56) References Cited

U.S. PATENT DOCUMENTS

| | | | |
|---|---|---|---|
| 2003/0088399 A1* | 5/2003 | Kusumoto | H04N 5/44513 704/10 |
| 2003/0213001 A1* | 11/2003 | Yuen | H04N 5/44543 725/136 |
| 2005/0172319 A1* | 8/2005 | Reichardt | G11B 27/105 725/52 |
| 2007/0030818 A1* | 2/2007 | Bahnck | H04L 12/18 370/270 |
| 2008/0196075 A1* | 8/2008 | Candelore | H04N 5/44543 725/113 |
| 2009/0009532 A1* | 1/2009 | Hallberg | G06K 9/325 345/636 |
| 2009/0019493 A1 | 1/2009 | Li et al. | |
| 2009/0025051 A1* | 1/2009 | Hong | H04N 7/17318 725/114 |
| 2009/0030681 A1* | 1/2009 | Sureka | G10L 15/193 704/235 |
| 2009/0097530 A1* | 4/2009 | Dhodapkar | H04H 60/43 375/131 |
| 2009/0133073 A1* | 5/2009 | DaLaCruz | H04N 5/44543 725/49 |
| 2010/0060786 A1* | 3/2010 | Kim | H04N 5/50 348/463 |
| 2010/0169920 A1* | 7/2010 | Michel | H04N 5/445 725/39 |
| 2010/0235859 A1* | 9/2010 | Takaya | H04N 5/50 725/38 |
| 2011/0088040 A1* | 4/2011 | Sheehan | G06F 16/14 718/104 |
| 2011/0283324 A1* | 11/2011 | Oh | H04N 21/234336 725/53 |
| 2014/0019127 A1* | 1/2014 | Park | G10L 15/01 704/235 |
| 2014/0082646 A1* | 3/2014 | Sandland | H04N 21/44008 725/14 |
| 2014/0123185 A1* | 5/2014 | Nam | H04N 21/4394 725/38 |
| 2014/0157324 A1* | 6/2014 | Mao | G06F 17/301 725/54 |
| 2014/0204277 A1 | 7/2014 | Adderly et al. | |
| 2015/0189372 A1* | 7/2015 | Lee | H04N 21/4383 725/56 |
| 2015/0201246 A1* | 7/2015 | Son | G10L 15/22 725/53 |
| 2016/0112670 A1 | 4/2016 | Majid | |
| 2018/0144745 A1* | 5/2018 | Park | H04N 21/42203 |

FOREIGN PATENT DOCUMENTS

| | | |
|---|---|---|
| KR | 10-2011-0072534 A | 6/2011 |
| KR | 10-2012-0072169 A | 7/2012 |
| KR | 10-2014-0055502 A | 5/2014 |
| KR | 10-2015-0078229 A | 7/2015 |

* cited by examiner

| | DUID | HeadendID | Data-Time | LCN | Source ID | Channel Name |
|---|---|---|---|---|---|---|
| USER 1 | GIRH37DWI2MWZ | 771008999 | 2016-00-00 12:00:00 | 13 | 666 | EBS2 |
| USER 2 | WP5XEZFMAOKPP | 771008999 | 2016-00-00 12:00:00 | 17 | 777 | CatchOn1 |
| USER 3 | ZP6XEZFPAOKPP | 771008999 | 2016-00-00 12:00:00 | 18 | 778 | CatchOn2 |
| | .... | | | | | |
| | | | | | | |

DISPLAY APPARATUS AND METHOD FOR ACQUIRING CHANNEL INFORMATION OF A DISPLAY APPARATUS

CROSS-REFERENCE TO RELATED APPLICATION

This application claims priority from Korean Patent Application No. 10-2016-0166672, filed in the Korean Intellectual Property Office on Dec. 8, 2016, the disclosure of which is incorporated herein by reference in its entirety.

BACKGROUND

1. Field

Apparatuses and methods consistent with example embodiments relate to a display apparatus and a method for acquiring channel information thereof.

2. Description of Related Art

With the development of techniques of voice recognition and intention analysis, a user can control the functions of a display apparatus by uttering a voice. For example, a user can change a channel by uttering the channel name in a voice when converting a channel.

In the case of changing a channel by uttering a voice, the channel name is obtained through voice recognition, the channel map is searched using the obtained channel name as a search keyword, the channel number corresponding to the channel name is searched for in the channel map, and the channel can be changed.

The channel map can be provided from a content provider (CP), and the channel map provided by a CP can be stored in a search server.

Meanwhile, if there is an error in the channel map provided in a CP stored in a search server, that is, for example, if the channel number corresponding to a channel name is omitted, if the channel number is not mapped to the channel name properly, or if the channel name is changed, it would be difficult for a user to change a channel by uttering the channel name.

To check such an error in the channel map, the channel name should be uttered directly while watching the TV in the corresponding region and whether the channel map operates properly should be checked. However, it may be impossible to check the error in the channel map of every region which provides a voice service. It may also be difficult to secure an exact channel map because the channel maps of a company which provides multiple TV program information are all different.

SUMMARY

According to aspect of an example embodiment, there is provided a method for acquiring channel information of a display apparatus, the method including receiving a user input for selecting a channel; displaying, on a display, content corresponding to the channel; acquiring a channel number, a source ID and a channel name with respect to the channel; and transmitting the channel number, the source ID and the channel name to a server.

The channel name may be acquired based on a user input.

The channel name may be acquired by image-processing of channel name information that is displayed on an area of the content.

The acquiring the source ID may include acquiring the source ID from a broadcast signal received through a tuner.

According to aspect of another example embodiment, there is provided a method for updating channel information of a server, the method including: receiving a channel number, a source ID and a channel name from a plurality of display apparatuses; searching for channel information including the source ID in a channel map stored in a memory; and updating the channel information based on a result of the searching.

The channel map may include a second channel number, a second source ID, a second channel name, and an alias.

The method may further include comparing the channel name and the second channel name in response to retrieving the channel information including the source ID; and adding the channel name to the alias in response to determining that the channel name is different than the second channel name.

The method may further include adding the received channel number, the received source ID, and the received channel name to the channel map in response to channel information including the source ID not being retrieved.

According to aspect of another example embodiment, there is provided display apparatus including: an input interface configured to receive a user input for selecting a channel; a tuner configured to receive a broadcast signal corresponding to the channel; a display configured to display a content included in the broadcast signal; a memory configured to store channel information obtained from the broadcast signal; a communicator configured to communicate with an external apparatus; and a controller configured to: select a channel based on the user input; control the display to display content corresponding to the channel; acquire a channel number, a source ID and a channel name with respect to the channel; and transmit the channel number, the source ID and the channel name to a server.

The controller may be further configured to acquire the channel name based on a user input.

The controller may be further configured to acquire the channel name by image-processing of channel name information that is displayed on an area of the content.

According to aspect of another example embodiment, there is provided a server including: a communicator configured to communicate with a plurality of display apparatuses; a memory configured to store a channel map; and a controller configured to: receive a channel number, a source ID and a channel name from the plurality of display apparatuses through the communicator; search for channel information including the source ID in a channel map stored in the memory; and update the channel information based on a result of the search.

The channel map may include a second channel number, a second source ID, a second channel name, and an alias.

The controller may be further configured to compare the channel name and the second channel name in response to retrieving the channel information including the source ID, and add the channel name to the alias in response to determining that the channel name is different than the second channel name.

The controller may be further configured to add the received channel number, the received source ID, and the received channel name to the channel map in response to channel information including the source ID not being retrieved.

BRIEF DESCRIPTION OF THE DRAWINGS

FIG. 9 is a diagram illustrating an example of channel information which an event server receives, according to an example embodiment;

DETAILED DESCRIPTION

Figure 1:
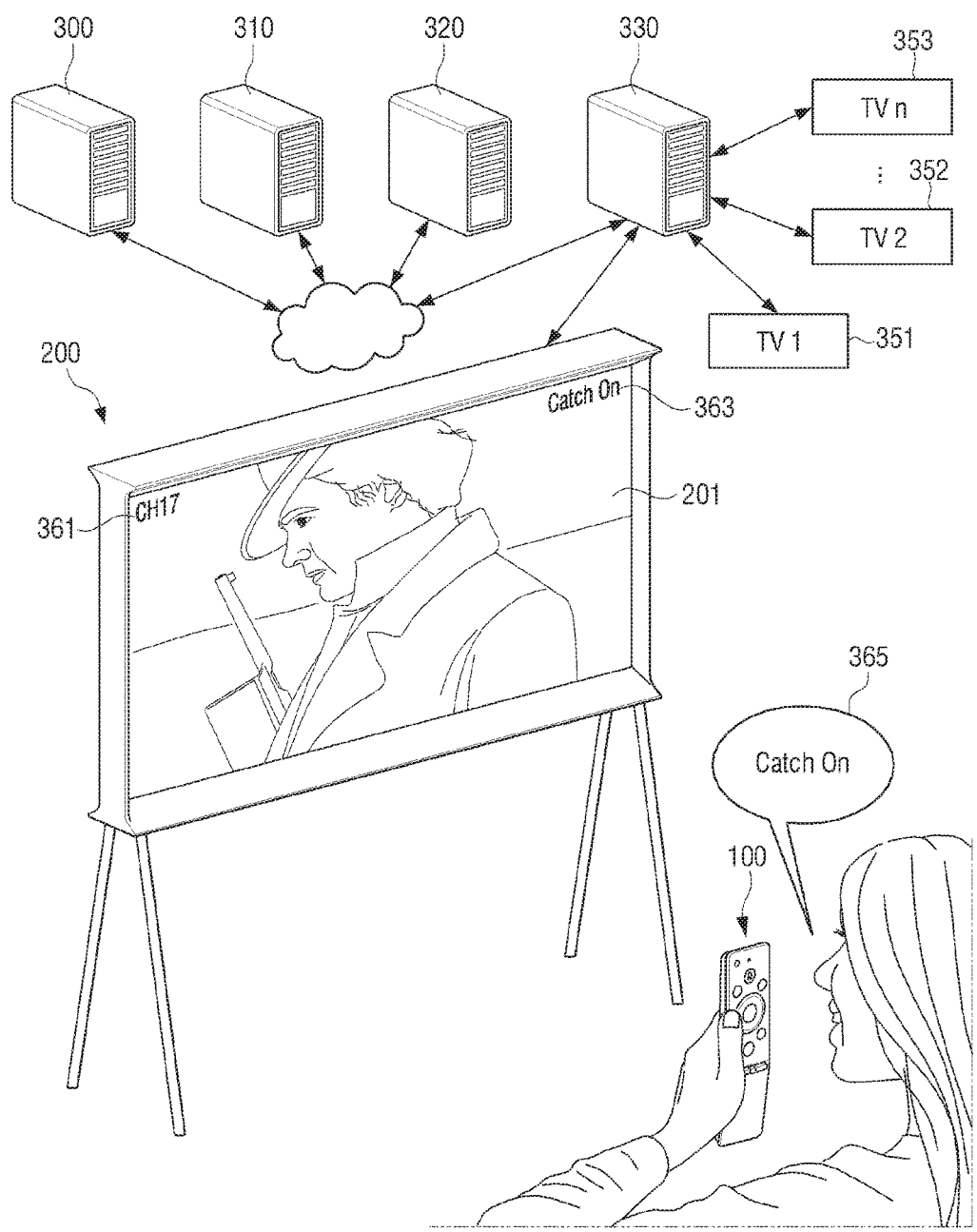
FIG. 1 is a schematic diagram illustrating an operation among a display apparatus, a remote controller and a server, according to an example embodiment.

The display apparatus according to example embodiments may acquire the information on the channel that a plurality of users actually view and provide the channel information. Accordingly, the channel map can be updated in real time and a user can be provided with exact channel information.

Hereinafter, various example embodiments of the present disclosure will be described in greater detail with reference to the accompanying drawings. Further, the method for manufacturing and using an electronic apparatus according to example embodiments with reference to the drawings. In the following description, the same drawing reference numerals in each diagram indicate the component or the element which substantively performs the same function.

The terms including ordinal number such as "first," "second," and so on may be used in the description and the claims to distinguish the elements from one another. These terms are used only for the purpose of differentiating one component from another, without limitation thereto. For example, without departing from the scope as described herein, a first element may be referred to as a second element, or similarly, a second element may be referred to as a first element. The term "and/or" includes a combination of a plurality of described relevant items or any item of a plurality of described relevant items.

In the example embodiments, the 'selection of a button (or a key)' provided in a remote controller (a remote controller 100, please see FIG. 1) may be the term which refers to 'pressing a button (or a key)' or 'touching a button (or a key).' Also, the term 'user input' may include, for example, 'selecting a button (or a key) by a user,' pressing a button (or a key) by a user, 'touching a button by a user,' a touch gesture of a user,' a user voice' or 'a user motion.'

In the example embodiments, the term 'a screen of a display device' may include a display of a display apparatus.

The terms used in this description are provided to explain the example embodiments of the present disclosure, and not for restricting and/or limiting the present disclosure. A singular term includes a plural form unless otherwise indicated. The terms, "include," "comprise," "is configured to," etc. of the description are used to indicate the existence of features, numbers, steps, operations, elements, parts or combination thereof, and do not exclude the possibilities of combination or addition of one or more features, numbers, steps, operations, elements, parts or combination thereof.

The same reference numerals in the drawings refer to the elements substantially performing the same functions.

FIG. 1 is a schematic diagram illustrating an operation among a display apparatus, a remote controller and a server according to an example embodiment.

In FIG. 1, a display apparatus 200, a remote controller 100, and a plurality of servers 300, 310, 320 and 330 are illustrated. The display apparatus 200 may be the term which refers to a TV, but is not limited thereto.

The display apparatus 200 which can display content as well as a received broadcast on the screen may receive a user voice using a microphone 240 (please see FIG. 2) that is embedded in the display apparatus or is connectable with the display apparatus. The remote controller 100 may receive a user voice using a microphone 163 (please see FIG. 2).

The remote controller 100 may control the display apparatus 200 by outputting (or transmitting) a control command through infrared or nearfield communication (e.g., Bluetooth, etc.). The remote controller 100 may convert a voice received through infrared or nearfield communication (e.g., Bluetooth, etc.) and transmit the converted voice to the display apparatus 200.

Figure 2:
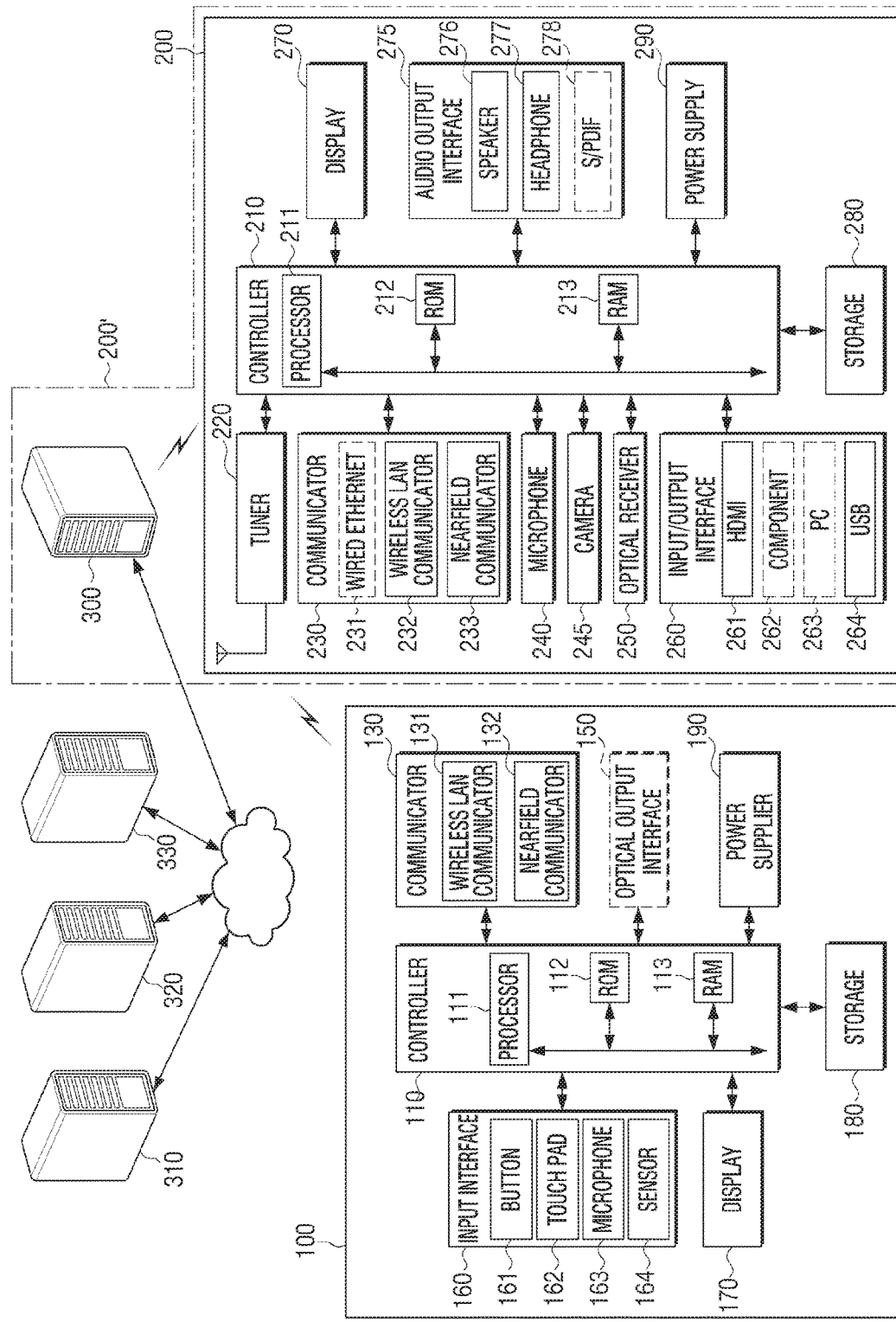
FIG. 2 is a block diagram illustrating a display apparatus, a remote controller and a server, according to an example embodiment.

A user may control (e.g., powering on/off, booting, changing a channel, adjusting volume, or reproducing content, etc.) the display apparatus 200 by selecting a key (including a button) provided on the remote controller 100 or by a user input (e.g., a touch [gesture] through a touchpad, a voice recognition through a microphone 163, or a motion recognition through a sensor 164 [please see FIG. 2]).

A user may control the display apparatus 200 using his/her voice. The microphone 163 of the remote controller 100 may receive a user voice for controlling the display apparatus 200. The remote controller 100 may convert the receive voice into an electric signal (e.g., a digital signal, digital data or a packet) and transmit the signal to the display apparatus 200.

For example, a user may change a channel by uttering the channel name 'Catch on 365.' The display apparatus may display the content corresponding to the channel on the display 201 accordingly.

The content displayed on the display 201 may include channel name information 363. The channel name information 363 may be a part of content, and may be displayed on the partial area of content in the form of watermark.

The channel name information 363 may be displayed on the upper right end on the screen, and a user may check the channel name of the currently being broadcast channel. The display apparatus 200 may acquire text data corresponding to the channel name by processing the channel name information 363 by the image-processing method such as an optical character recognition (OCR).

Hereinafter, 'the text data corresponding to a channel name' may be referred to as 'channel name.' Also, the channel name information 363 may refer to the channel name which is a part of content and is displayed in the form of watermark on the display.

On the display 201, the channel number 361 may be displayed. The channel number 361 may be created in the display apparatus 200 or be obtained from a broadcast signal.

The channel number 361 may be displayed as being overlapped with content. The tuning frequency of a tuner included in the display apparatus may be determined according to the channel number 361.

A user may control (e.g., powering on/off, booting, changing a channel, adjusting volume or reproducing content, etc.) the display apparatus 200 using a motion recognition through a camera 245 (please see FIG. 2) attached to the display apparatus. The user may also control the screen of the display apparatus 200 using the motion (e.g., gripping or moving the remote controller 100) of the remote controller 100.

The remote controller 100 may include a button 161 (or a key) which corresponds to the function and/or the operation of the display apparatus 200. The button 161 may include a physical button or a touch button.

The voice recognition server 300 may convert an electric signal (or a packet corresponding to an electric signal) corresponding to a user voice input in the remote controller 100 or the display apparatus 200 into voice data (e.g., text, a code, etc.) generated through a voice recognition. The converted voice data may be transmitted to a dialog analysis server 310 via the display apparatus 200 or may be directly transmitted to the dialog analysis server 310.

The dialog analysis server 310 may convert the converted voice data into the control information (e.g., a control command for controlling the display apparatus 100) which can be recognized by the display apparatus 200. The converted control information may be transmitted to the display apparatus 200.

A search server 320 may store a program guide (an electronic program guide [EPG]) information. The search server 320 may transmit to the display apparatus 200 a list of related contents which are retrieved by searching with a keyword corresponding to a content name, a person's name, a channel name and a genre. The search server 320 may also make a channel map using the EPC data and store the channel map.

The event server 330 may be connected with a plurality of display apparatuses 200, 351, 352 and 353 via a communication network. The event server 330 may store event information generated in the display apparatuses 200, 351, 352 and 353.

The event information may be generated when a certain function is performed by a user by manipulating the display apparatuses 200, 351, 352 and 353 or when the display apparatuses operate. For example, the event information may be generated when user A adjusts the volume in the display apparatus 351, and the generated event information may be transmitted to the server 330 with a unique ID of the display apparatus 351.

The event information may also be generated when user B changes a channel in the display apparatus 352, and the generated event information may be transmitted to the server 330 with a unique ID of the display apparatus 352.

The event information may include the channel information (e.g., a source ID and a channel name) related to the viewed channel if a user changes a channel. The event server 330 may store the event information generated in a device with the device ID.

The voice recognition server 300, the dialog analysis server 310, the search server 320 and the event server 330 may be connected to one another through wireless communication. Each server may also be connected with a display apparatus of a user through wired or wireless communication.

The voice recognition server 300, the dialog analysis server 310, the search server 320 and the event server 330 may be integrated as one server or be divided into two or more servers and perform its own function, depending on the implementation.

According to an example embodiment, it is described that the voice recognition server 300, the dialog analysis server 310, the search server 320 and the event server 330 are separate from one another for ease of description, but the servers may also be implemented such that the function of each server is integrated into one server. For example, the search server 320 may include the event server 330.

FIG. 2 is a block diagram illustrating a display apparatus, a remote controller and a server according to an example embodiment.

Referring to FIG. 2, the display apparatus 200 which receives an electric signal corresponding to a user voice from the remote controller 100 may be connected with an external device (e.g., the servers 300 to 330) via cable or wirelessly using a communicator 230 and an input/output interface 260.

The display apparatus 200 may transmit a received electric signal (or a packet corresponding to an electric signal) to an external device (e.g., a server 300) connected via cable or wirelessly using the communicator 230 or the input/output interface 260. The display apparatus 200 may also transmit an electric signal (or a packet corresponding to an electric signal) corresponding to a user voice which is received through the microphone 240 to the external device (e.g., a server 300) connected via cable or wirelessly using the communicator 230 or the input/output interface 260.

The display apparatus 200 may be electrically connected with a separate electronic device which includes a tuner.

The display apparatus 200 may be implemented as, for example, an analog TV, a digital TV, a 3D TV, a smart TV, an LED TV, an OLED TV, a plasma TV, a monitor, a curved TV having a screen (or a display) with a fixed curvature, a flexible TV having a screen with a fixed curvature, a bended TV having a screen with a fixed curvature, and/or a curvature-changeable TV which can change the curvature of a current screen by a received user input, but is not limited thereto.

The display apparatus 200 may include a tuner 220, a communicator 230, a microphone 240, a camera 245, an optical receiver 250, an input/output interface 260, a display 270, an audio output interface 275, a storage 280 (e.g., memory) and a power supply 290. The display apparatus 200 may include a sensor (e.g., an illumination sensor, a temperature sensor, etc.) which detects an internal state or an external state of the display apparatus 200.

The controller 210 may include a processor 211, a ROM 212 (or a non-volatile memory) in which a control program for controlling a display apparatus 200 is stored, and a RAM 213 (or a volatile memory) which stores a signal or data input from the outside of the display apparatus 200 or which is used as a storage area corresponding to various operations performed in the display apparatus 200.

The controller 210 may control overall operations of the display apparatus 200 and a signal flow among the internal components 210 to 290 of the display apparatus 200, and process data. The controller 210 may control power supplied from the power supply 290 to the internal components 210 to 290. Also, when there is a user input or if a predetermined condition that is stored is satisfied, the controller 210 may execute an operating system (O/S) stored in the storage 280 or various applications.

The processor 211 may further include a graphic processor for graphic-processing corresponding to an image or a video. The processor 211 may be implemented as including a graphic processor, or the graphic processor may be a separate component. The processor 211 may also be implemented as a system on chip including a core and a graphic processor. The processor 211 may also be implemented as a SoC including at least one of the ROM 212 or the RAM 213. The processor 211 may include a single core, a dual core, a triple core, a quad core or a multiple core.

The processor 211 of the display apparatus 200 may include a plurality of processors. The plurality of processors may include a main processor and a sub processor which operates in a screen-off mode (or a power-off mode) and/or in a preparation mode, which is one of the states of the display apparatus 200. The plurality of processors may further include a sensor processor which controls a sensor.

The processor 211, the ROM 212 and the RAM 213 may be connected with one another via an internal bus.

The controller 210 may control a display which displays content and a communicator which is connected with a remote controller and a voice recognition server, and transmit to the voice recognition server the signal corresponding to a user voice that is received from the remote controller via the communicator.

According to an example embodiment, the term 'the controller of the display apparatus 200' may include the processor 211, the ROM 212 and the RAM 213 of the display apparatus 200. The term 'the controller of the display apparatus 200' may also refer to the processor 211 of the display apparatus 200, or may include the main processor, the sub processor, the ROM 212 and the RAM 213.

The configuration and operation of the controller 210 may be implemented in various ways according to an example embodiment.

The tuner 220 may select only the frequency of the channel which the display apparatus 200 intends to receive among a plurality of radio wave elements by tuning only the frequency by amplification, mixing, resonance, etc. of the broadcast signal received via cable or wirelessly. The broadcast signal may include a video, audio and additional data (e.g., an electronic program guide [EPG]).

The tuner 220 may receive a video, audio and data (hereinafter, referred to as a broadcast signal) using a tuning frequency corresponding to the channel number (e.g., a cable broadcasting channel No. 506) which corresponds to a user input (e.g., a voice, a motion, a button input, a touch input, etc.).

The tuner 220 may receive a broadcast signal from various sources such as terrestrial broadcasting, cable broadcasting, satellite broadcasting, Internet broadcasting, or the like.

The tuner 220 may be implemented as being integrated into the display apparatus 200 as an all-in-one type, or be implemented as a tuner that is electrically connected with the display apparatus 200 or a separate electronic device (e.g., a set-top box or an one-connect) having a tuner.

The communicator 230 may connect the display apparatus 200 with the remote controller 100 or with external devices under control of the controller 210. The communicator 230 may transmit an electric signal (or a packet corresponding to an electric signal) corresponding to a user voice to the voice recognition server 300 or receive voice data corresponding to an electric signal (or a packet corresponding to an electric signal) from the voice recognition server 300 under control of the controller 210. The communicator 230 may also transmit voice data received under control of the controller 210 to the dialog analysis server 310 or receive control information corresponding to voice data from the dialog analysis server 310.

The communicator 230 may download an application from the outside or perform web-browsing under control of the controller 210.

The communicator 230 may include one of a wired Ethernet 231, a wireless LAN communicator 232 and a nearfield communicator 233 depending on the performance and structure of the display apparatus 200. The communicator 230 may also include the combination of the Ethernet 232, the wireless LAN communicator 232 and the nearfield communicator 233.

The wireless LAN communicator 231 may be connected with an AP wirelessly in the place where the AP is installed under control of the controller 210. For example, the wireless LAN communicator 231 may include Wi-Fi. The wireless LAN communicator 232 supports the wireless LAN standard of Institute of Electrical and Electronics Engineers (IEEE). Also, the nearfield communicator 233 may perform nearfield communication with the remote controller 100 and an external device wirelessly without an AP under control of the controller 210. The nearfield communication may include, for example, Bluetooth, Bluetooth low energy, infrared data association (IrDa), ultra-wideband (UWB), near field communication (NFC), or the like.

The communicator 230 according to an example embodiment may receive a control signal transmitted from the remote controller 100. The nearfield communicator 233 may receive a control signal transmitted from the remote controller 100 under control of the controller 210.

The microphone 240 may receive a voice uttered by a user. The microphone 240 may convert the received voice into an electric signal and output the signal to the controller 210. For example, the user voice may correspond to the control of a user guide, a menu or a function of the display apparatus 200. The recognition range of the microphone 240 may vary depending on the volume of user voice and the surrounding environment (e.g., speaker sounds, surrounding noises, etc.).

The microphone 240 may be implemented as being integrated into the display apparatus 200 or be implemented as a separate device. The separate microphone 240 may be electrically connected with the display apparatus 200 through the communicator 230 or the input/output interface 260.

A camera 245 may record a video (e.g., consecutive frames) corresponding to a user motion within the recognition range of the camera. The user motion may include, for example, a presence of a user (e.g., a user appears within the recognition range of the camera) and a part of user body or a motion of a part of a user body such as a face, a facial expression, a hand, a fist, a finger, or the like. The camera 245 may be configured with a lens and an image sensor.

The camera 245 may be positioned on the upper end, the lower end, the left or the right.

The camera 245 may convert consecutive frames photographed under control of the controller 110 and output the converted frames to the controller 210. The controller 210 may analyze the photographed consecutive frames, and recognize a user motion. The controller 210 may display a guide or a menu on the display apparatus 200 using the result of the motion recognition, or may perform a control (e.g., a channel control or a volume control, etc.) corresponding to the result of the motion recognition.

If the camera 245 is a plurality of cameras, a 3D still image or a 3D motion (a video or an image) may be received.

The camera 245 may be implemented as being integrated into the display apparatus 200 or be implemented as a separate device. The electronic device including the separate camera may be electrically connected with the display apparatus 200 through the communicator 230 or the input/output interface 260.

The optical receiver 250 may receive an optical signal (including a control signal) output from the remote controller 100 through an optical window.

The optical receiver 250 may receive an optical signal corresponding to a user input (e.g., touching, pressing, a touch gesture, a voice or a motion) from the remote controller 200. A control signal may be obtained from the received optical signal. The received optical signal and the obtained control signal may be transmitted to the controller 210.

The input/output interface 260 may receive content from the outside of the display apparatus 200 under control of the controller 210. The content may include a video, an image, text or web document.

The input/output interface 260 may include one of an HDMI input port 261 (a high-definition multimedia interface port), a component input jack 262, a PC input port 263 and a USB input jack 264. The input/output interface 260 may also include the combination of the HDMI input port 261, the component input jack 262, the PC input port 263 and the USB input jack 264. It may be well-understood by a person having ordinary skill in the art that the input/output interface 260 may be added, excluded, and/or changed depending on the performance and the structure of the display apparatus 200.

The display 270 may display the content included in a broadcast signal received through the tuner 220 under control of the controller 210. The content may include channel name information (the reference numeral 363 in FIG. 1).

The display 270 may display the content (e.g., a video) input through the communicator 230 or the input/output interface 260. The display 270 may output the content stored in the storage 280 under control of the controller 210. The display 270 may also display a voice user interface (UI) for performing a voice recognition task corresponding to a voice recognition or a motion UI for performing a motion recognition task corresponding to a motion recognition. For example, the voice UI may include a voice command guide (e.g., recommendation voice data or a recommendation guide), and the motion UI may include a motion command guide.

The display 270 may display a broadcast channel number, a broadcast channel name and/or the state (e.g., a screen-off, a preparation mode, a welcome mode and/or a normal mode) of a display apparatus, which are displayed on the display apparatus 200.

When an optical signal is output from the remote controller 100 to the display apparatus 200, the display 270 may display text, an icon or a symbol which corresponds to "TV on" for turning on the display apparatus 200, "TV off" for turning off the display apparatus 200, "Ch No." for displaying a selected channel number, or "Vol value" indicating volume adjustment under control of the controller 210.

For example, the display 270 may include a display using a liquid crystal display (LCD) method, a display using an organic light emitting diodes method, or a display using a vacuum fluorescent display (VFD) method.

The term 'the screen of the display apparatus 200' according to an example embodiment may include the display 270 of the display apparatus 200.

The display 270 according to an example embodiment may display a channel number (the reference numeral 361 in FIG. 1) under control of the controller 210.

The display 270 according to an example embodiment may be separated from the display apparatus 200, and be electrically connected with the display apparatus 200 through the input/output interface 260.

An audio output interface 275 may output audio included in a broadcast signal received through the tuner 220 under control of the controller 210. The audio output interface 275 may output audio (e.g., corresponding to a voice or sound) input through the communicator 230 or the input/output interface 260. The audio output interface 275 may output an audio file stored in the storage 280 under control of the controller 210.

The audio output interface 275 may include one of a speaker 276, a headphone output terminal 277 or an S/PDIF output terminal 278, or may include the combination of the speaker 276, the headphone output terminal 277 and the S/PDIF output terminal 278.

The storage 280 may store various data, programs or applications for driving and controlling the display apparatus 200 under control of the controller 210. The storage 280 may store an input/output signal or data which corresponds to the driving of the tuner 220, the communicator 230, the microphone 240, the camera 245, the optical receiver 250, the input/output interface 260, the display 270, the audio output interface 275 and the power supply 290.

The storage 280 may store a control program for controlling the display apparatus 200 and the controller 210, an application which is firstly provided from the manufacturing company or is downloaded, a graphical user interface (hereinafter, it refers to as a GUI) related to an application, an object for providing a GUI (e.g., image text, an icon, a button, etc.), user information, documents, a voice database, a motion database or related data.

The storage 280 may include a broadcast receiving module, a channel control module, a volume control module, a communication control module, a voice recognition module, a motion recognition module, an optical receiving module, a display control module, an audio control module, an external input control module, a power control module, a voice database (DB) or a motion database (DB).

The modules and the databases in the storage 280 may be implemented as software to perform a broadcast receiving control function, a channel control function, a volume control function, a communication control function, a voice recognition function, a motion recognition function, an optical receiving control function, a display control function, an audio control function, an external input control function, or a power control function. The controller 210 may perform an operation and/or a function of the display apparatus 200 using the above software stored in the storage 280.

The storage 280 may store voice data received from a voice recognition server 300. The storage 280 may store control information received from the voice recognition server 300. The storage 280 may also store control information received from the dialog analysis server 310.

The storage 280 may store the database corresponding to the phoneme which corresponds to a user voice. The storage 280 may also store a control information database corresponding to voice data.

The storage 280 may store EPG data obtained from a broadcast signal. The EPG data may include a channel number, a source ID and a channel name.

According to an example embodiment, the term 'storage' may include the storage 280, the ROM 212 and the RAM 213 of the controller 210, a storage implemented as an SoC, a memory card (e.g., a micro SD card, a USB memory, etc.) provided in the display apparatus 200, or an external storage (e.g., a USB memory, etc.) which can be connected to an USB port 264 of the input/output interface 260. The storage may also include a non-volatile memory, a volatile memory, a hard disk drive (HDD) or a solid state drive (SSD).

The power supply 290 may supply power input from an external power source to the components 210 to 290 provided in the display apparatus 200 under control of the controller 210. The power supply 290 may also supply power input from one or two or more batteries provided inside the display apparatus 200 to the components 210 to 290 provided in the display apparatus 200 under control of the controller 210.

The power supply 290 may include a battery which supplies power to the camera 245 of the display apparatus 200 whose power is turned off (however, the power plug is connected to an outlet).

With regard to the elements (e.g., the components 210 to 290) illustrated in the display apparatus 200 in FIGS. 1 and 2, at least one of the elements may be added, changed or excluded (e.g., at least one of the boxes illustrated by a dotted line) depending on the performance and/or the type of the display apparatus 200. Also, the positions of the elements (e.g., the components 210 to 290) may be changed depending on the performance or the structure of the display apparatus 200.

The remote controller 100 which remotely controls the display apparatus 200 may include the controller 110, the communicator 130, the input interface 160, the optical output interface 150, the display 170, the storage 180 and the power supply 190. The remote controller 100 may include one of the communicator 130 and the optical output interface 150, or may include both the communicator 130 and the optical output interface 150.

The remote controller 100 may be used as the term which refers to an electronic apparatus which can remotely control the display apparatus 200. The remote controller 100 may also include an electronic device which can install (or can download from the outside) an application for controlling the display apparatus 200.

The electronic device in which an application for controlling the display apparatus 200 is installed may include a display (e.g., a display with only a display panel without a touch screen or a touch panel). For example, the electronic device having a display may include a cell phone, a smart phone, a tablet PC, a note PC, other display devices, or an electronic device (e.g., a refrigerator, a washing machine or a vacuum cleaner, etc.).

A user may control the display apparatus 200 using a function button (e.g., a channel change button) provided in a graphic user interface (GUI) provided from an executed application.

The controller 110 may include a ROM 112 (or a non-volatile memory) in which a control program for controlling a processor 111 and the remote controller 100 is stored, and a RAM 113 (or a volatile memory) which stores a signal or data input from the outside of the remote controller 100 or which is used as a storage area for various operations performed in the remote controller 100.

The controller 110 may control overall operations of the remote controller 100 and a signal flow among the internal components 110 to 190, and process data. The controller 110 may control power supplied to the internal components 110 to 190 using the power supply 190.

According to an example embodiment, the term "controller 110" may include the processor 111, the ROM 112 and the RAM 113 of the remote controller 100.

The communicator 130 may transmit a control signal (e.g., a control signal corresponding to turning on the power, or a control signal corresponding to volume control, etc.) corresponding to a user input (e.g., touching, pressing, a touch gesture, a voice or a motion) to the display apparatus 200, which is a control object, under control of the controller 110.

The communicator 130 may be connected with the display apparatus 200 wirelessly under control of the controller 110. The communicator 130 may include at least one of a wireless LAN communicator 131 and a nearfield communicator 132 (for example, one of the wireless LAN communicator 131 and the nearfield communicator 132, or both the wireless LAN communicator 131 and the nearfield communicator 132).

The communicator 130 of the remote controller 100 is substantively similar to the communicator 230 of the display apparatus 200, and thus, the overlapped description will not be repeated.

The input interface 160 may include the button 161 or the touch pad 162 which receives a user input (e.g., touching or pressing) for controlling the display apparatus 200. The input interface 160 may include the microphone 163 which receives an uttered user voice, a sensor 164 which detects the motion of the remote controller 100 or a vibration motor which provides a haptic feedback.

The input interface 160 may output an electric signal (e.g., an analog signal or a digital signal) corresponding to a received user input (e.g., touching, pressing, a touch gesture, a voice or a motion) to the controller 110.

The touch pad 162 may receive a touch or a touch gesture of a user. The touch pad 162 may be implemented as a direction key and an enter key. Also, the touch pad 162 may be positioned on the front surface of the remote controller 100.

The microphone 163 may receive an uttered user voice. The microphone 163 may convert a received voice and output the voice to the controller 110. The controller 210 may generate a control signal (or an electric signal) corresponding to a user voice and transmit the control signal to the display apparatus 200 through the communicator 130.

The sensor 164 may detect the internal state and/or the external state of the remote controller 100. For example, the sensor 164 may include a motion sensor, a gyro sensor, an acceleration sensor, or a gravity sensor. The sensor 164 may measure a motion acceleration or a gravity acceleration of the remote controller 100.

The vibration motor may convert a signal into mechanical vibration under control of the controller 210. For example, a vibration motor may include a linear vibration motor, a bar-type vibration motor, a coin-type vibration motor or a piezoelectric element vibration motor. One or a plurality of vibration motor(s) may be provided inside the remote controller 100.

The optical output interface 150 may output an optical signal (including a control signal, for example) corresponding to a user input (e.g., touching, pressing, a touch gesture, a voice or a motion) under control of the controller 110. The output optical signal may be received in the optical receiver 250 of the display apparatus 200. The remote controller code format used in the remote controller 100 may be one of the remote controller code format which is exclusively used by a manufacturing company and the commercially used remote controller code format. The remote controller code format may include a leader code and a data word. The output optical signal may be modulated by a carrier wave and output. The control signal may be stored in the storage 280 or be generated by the controller 110. The remote controller 100 may include an infrared-laser emitting diode (IR-LED).

The remote controller 100 may include one or both of the communicator 130 and the optical output interface 150 which can transmit a control signal to the display apparatus 200.

The controller 110 may output a control signal corresponding to a user voice to the display apparatus 200 through at least one of the communicator 130 and the optical output interface 150. The controller 110 may preferentially transmit a control signal corresponding to a user voice to the display apparatus 200 through at least one (e.g., the communicator 130) of the communicator 130 and the optical output interface 150.

The storage 180 (e.g., memory) may store various data, programs or applications for driving and controlling the remote controller 100 under control of the controller 110. The storage 180 may store an input or output signal, or data, which correspond to the driving of the communicator 130, the optical output interface 150 and the power supply 190.

The storage 180 may store the control information corresponding to a received user input (e.g., touching, pressing, a touch gesture, a voice or a motion) and/or the control information corresponding to the motion of the remote controller 100 under control of the controller 110.

The storage 180 may store the remote controller information corresponding to the remote controller 100. The remote controller information may include a model name, a unique device ID, the amount of residual memory, the information whether there is object data, a version of Bluetooth, or a profile of Bluetooth.

The power supply 190 may supply power to the components 110 to 190 of the remote controller 100 under control of the controller 110. The power supply 190 may supply to the elements 110 to 190 power provided from one or two or more batteries which are positioned in the remote controller 100. The batteries may be positioned in the internal space between the front surface (e.g., where the button 161 or the touch pad 162 are positioned) and the back surface.

With regard to the elements illustrated in the remote controller 100, at least one of the elements may be added or excluded (e.g., at least one of the boxes illustrated by a dotted line) depending on the performance of the remote controller 100. Also, the positions of the elements may be changed depending on the performance or the structure of the remote controller 100.

The voice recognition server 300 may receive through a communicator a packet corresponding to a user voice input in the remote controller 100 or the display apparatus 200. The controller of the voice recognition server 300 may analyze the received packet using a voice recognizer and a voice recognition algorithm and perform a voice recognition.

The controller of the voice recognition server 300 may convert a received electric signal (or a packet corresponding to an electric signal) into voice recognition data including a word or sentence type text using the voice recognition algorithm.

The controller of the voice recognition server 300 may transmit voice data to the display apparatus 200 through the communicator.

The controller of the voice recognition server 300 may convert the voice data into control information (e.g., a control command word). The control information may control the operations (or functions) of the display apparatus 200.

The voice recognition server 300 may include a control information database. The controller of the voice recognition server 300 may determine control information corresponding to the converted voice data using the stored control information database.

The voice recognition server 300 may also convert the converted voice data into the control information (e.g., which the controller 210 of the display apparatus 200 parses) for controlling the display apparatus 200 using the control information database.

The controller of the voice recognition server 300 may transmit the control information to the display apparatus 200 through the communicator.

According to an example embodiment, the voice recognition server 300 may be implemented as being integrated into the display apparatus 200 as an all-in-one type (200'). The voice recognition server 300 may be included in the display apparatus 200 as a separate component from the components 210 to 290 of the display apparatus 200. The voice recognition server 300 may be implemented as being embedded in the storage 280 or may be implemented as being provided in a separate storage.

The dialog analysis server 310 may convert the voice data converted in the voice recognition server 300 into control information. The dialog analysis server 310 may convert the voice data received from one of the voice recognition server 300 and the display apparatus 200 into control information. The dialog analysis server 310 may transmit the converted control information to the display apparatus 200.

The search server 320 may be provided with program guide (an electronic program guide [EPG]) information from a content provider (CP) and store the information in the storage. The search server 320 may transmit a list of related contents which are retrieved by searching with a keyword corresponding to a content name, a person's name, a channel name, and a genre to the display apparatus 200. The search server 320 may make a channel map using the EPG information and store the channel map.

The event server 330 may be connected with a plurality of display apparatuses 351, 352 and 353 via a communication network, and store the event information generated when a user uses all the functions of the display apparatuses. The event information may include the information on the channel (e.g., a channel number and a channel name) that a user views when the user changes a channel. The event information may store the event information generated from the device with a device ID of each user. According to an example embodiment, the search server 320 may perform the function of the event server 330 or include the event server 330.

Figure 3:
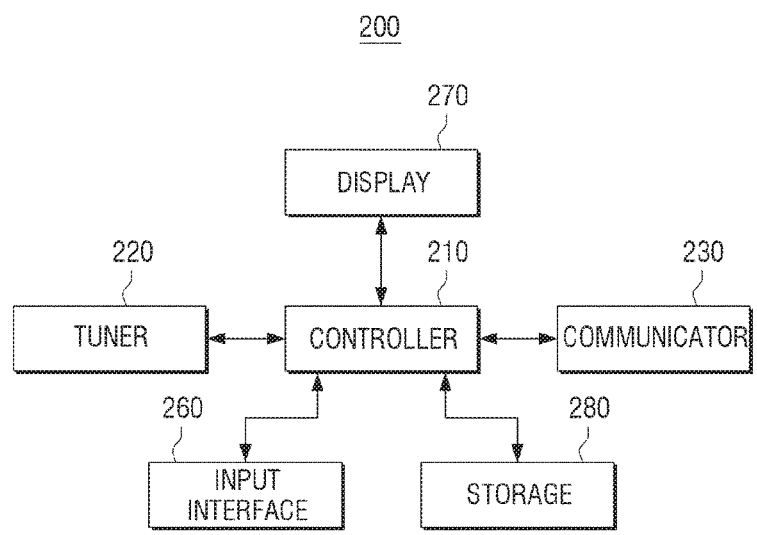
FIG. 3 is a block diagram illustrating a display apparatus, according to an example embodiment.

FIG. 3 is a block diagram illustrating a display apparatus briefly according to an example embodiment.

Referring to FIG. 3, the display apparatus 200 may include the tuner 220, the input interface 260, the display 270, the storage 280, the communicator 230, and the controller 210.

The input interface 260 may receive a user input for changing a channel. For example, if a user changes a channel by pressing a button included in the remote controller 100, by uttering 'a channel name' or by posing a certain motion, the input interface 260 may receive the user input for changing a channel. The input interface 260 may also receive a user input for controlling the function of the display apparatus.

The tuner 220 may receive a broadcast signal corresponding to a channel. The tuner 220 may tune frequency as a frequency assigned to a channel number and receive a broadcast signal. A broadcast signal may include additional data such as content and an EPG.

The display 270 may display the content included in a broadcast signal. The content may include a video, a still image, a web page and a user interface (UI). Also, the channel name information (the reference numeral 363 in FIG. 1) may be included in the part of the content. The channel name information may be inserted to the content in the form of watermark and be displayed on the display 270.

A channel number (the reference numeral 367 in FIG. 1) may be displayed on the display 270. The channel number may be displayed as being overlapped with content, and be generated in the display apparatus.

In the storage 280, the channel information obtained from a broadcast signal may be stored. The broadcast signal may include an EPG, and in the EPG, channel information may be included. The channel information may include a channel number, a source ID and a channel name. In some cases, the channel information may not include a channel name, or a channel name may not be exact.

The communicator 230 may communicate with an external device. The external device may be the servers 300, 310, 320 and 330 or the remote controller 100 which are illustrated in FIG. 2, or another electronic device.

The controller 210 may control the input interface 260, the tuner 220, the display 270, the storage 280, and the communicator 230. The controller 210 may receive a user input for changing a channel through the input interface 260, and change a channel based on the user input. The controller 210 may receive a broadcast signal related to the channel changed by the tuner. The controller 210 may obtain a channel number and a source ID from the received broadcast signal. The controller 210 may also obtain content from a broadcast signal and display the content on the display 270. The source ID may be a unique ID assigned to every channel, and when changing a channel in a display apparatus, the channel may be changed using the source ID corresponding to an input channel number or channel name.

The controller 210 may acquire a channel name from the content displayed on the display. The controller 210 may control a communicator and transmit a channel number, a source ID and a channel name to a server. The server may be an event server or a search server, but is not limited thereto.

Figure 4:
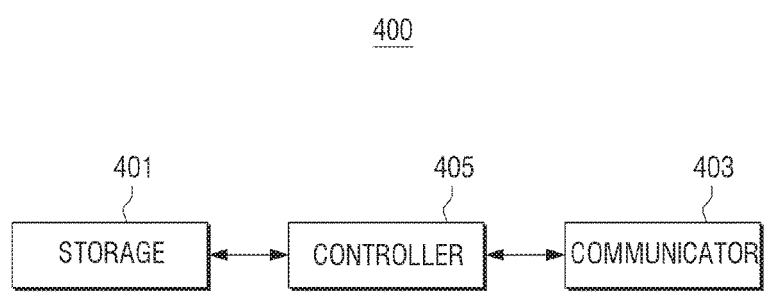
FIG. 4 is a block diagram of a search server, according to an example embodiment.

FIG. 4 is a block diagram illustrating a search server according to an example embodiment.

The server 400 may include a storage 401 (e.g., memory), a communicator 403 and a controller 405. The server 400 may be the search server 320 or the event server 330 which are illustrated in FIG. 2, but is not limited thereto. The voice recognition server 300 and the dialog analysis server 310 may include the same element.

According to an example embodiment, the search server 320 and the event server (the reference numeral 330 in FIG. 1) may be integrated as one server.

The storage 401 may store program guide information (EPG) provided by a content provider (CP). The storage 401 may store a channel map that is configured using the EPG information. The channel map will be described in detail with reference to FIG. 5.

The communicator 403 may receive from the dialog analysis server 310 a keyword for search, or transmit data corresponding to a processing result to the dialog analysis server 310. The communicator 403 may also receive channel information from the event server 330.

The communicator 403 may receive channel information from a plurality of display apparatuses depending on the implementation.

The controller 405 may make a channel map using the EPG information stored in the storage 401. The controller 405 may update a channel map using the channel information received from the event server (the reference numeral 330 of FIG. 1). The controller 405 may update the channel map using channel information received from a plurality of display apparatuses depending on the implementation. The controller 405 may search for the EPG information stored in the storage 401 using keywords received from the dialog analysis server 310 and generate a list of contents corresponding to the keywords, and transmit the list of contents to the dialog analysis server 310.

Figure 5:
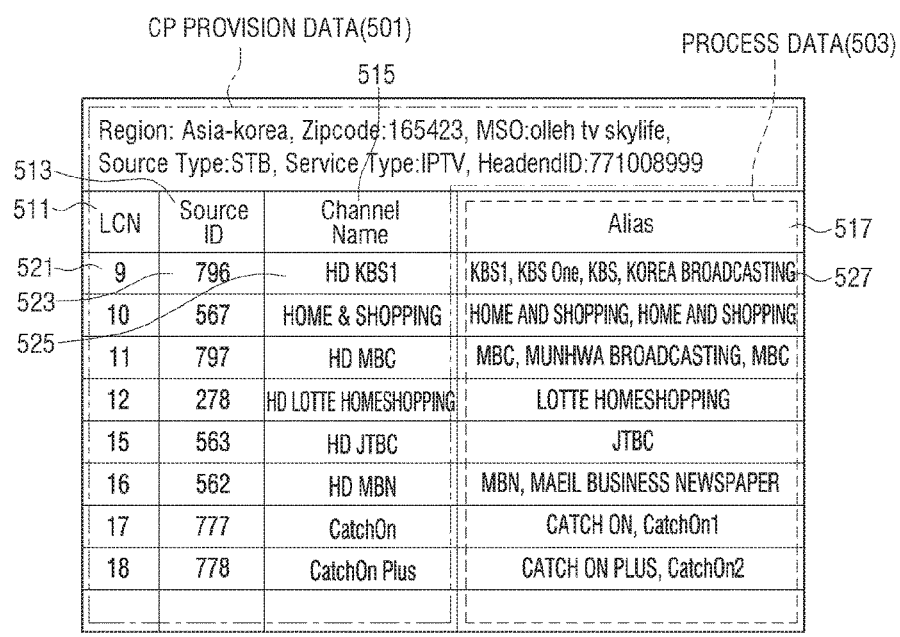
FIG. 5 is a diagram illustrating an example of a channel map stored in a search server, according to an example embodiment.

FIG. 5 illustrates an example of channel map stored in a search server.

Referring to FIG. 5, the channel map 500 may include CP provision data 501 and user process data 503.

The CP provision data 501 may be obtained from the EPG information provided by a CP. The CP provision data 501 may include a channel number 511 (a local channel number [LCN]), a source ID 513, a channel name 515 and an alias 517.

Hereinafter, the channel number 511 included in a channel map will be referred to as 'a second channel number,' the source ID 513 will be referred to as 'a second source ID,' and the channel name 515 may be referred to as 'a second channel name,' to distinguish the above elements from the channel number, the source ID and the channel name which are transmitted from a display apparatus.

The second channel number 511 may be different in each region even when the channel number is of the same broadcasting station, and a tuning frequency may be assigned according to the second channel number. For example, the second channel number 521 corresponding to the Korea Broadcasting may be '9.'

The second source ID may be the unique information assigned to a broadcasting station, and if the broadcasting station is the same, the second source ID 513 may have the same second source ID. The second source ID 513 may be used as identification information for identifying a broadcasting station, and also be used as a search keyword when searching for content. For example, the second source ID 523 of the Korea Broadcasting may be '796', and the second source ID may be the identification information of the Korea Broadcasting.

The second channel name 515 may be the name of a broadcasting station. The second channel name 515 may be changed, and the channel name may be different in each region. For example, the second channel name 525 of the Korea Broadcasting may be 'HD KBS1.'

The user process data 503 may include the alias 517.

The alias 517 may be the same as the second channel name 515 or be different from the second channel name 515. The alias 517 may be generated based on a user input, and there may be a plurality of aliases as a plurality of users may input the different alias 517.

A user may input a channel name using a button provided in a remote controller or by uttering a channel name while watching channel name information (a name of a broadcasting station) displayed on a display.

The alias 503 may be received from a plurality of users. For example, when a plurality of users input a channel name in his/her own display apparatus, the channel names may be transferred to a search server via an event server with a channel number and a source ID, and the search server may search for a channel map using the received channel numbers or source ID and update the channel map. The process of updating a channel map will be described in detail with reference to FIGS. 10 and 11.

The alias 517 may include a plurality of channel names. For example, the alias 527 may include 'KBS,' 'KBS ONE,' 'KBS' and 'the Korea Broadcasting' as aliases. When a user utters one of the words included in the second channel name 515 or the alias 517, a display apparatus may change a channel to the corresponding channel. For example, if a user utters one of the words 'KBS1,' 'KBS ONE,' 'KBS' and 'the Korea Broadcasting,' the display apparatus may change a channel to the corresponding channel number 512, that is, the channel number 9.

The channel map may also be stored in a display apparatus. The display apparatus may receive EPG information from a broadcast signal that is received through a tuner, obtain the channel number 511 (LCN), the source ID 513 and the channel name 515 from the EPG information, and store them in the storage of the display apparatus.

Figure 6:
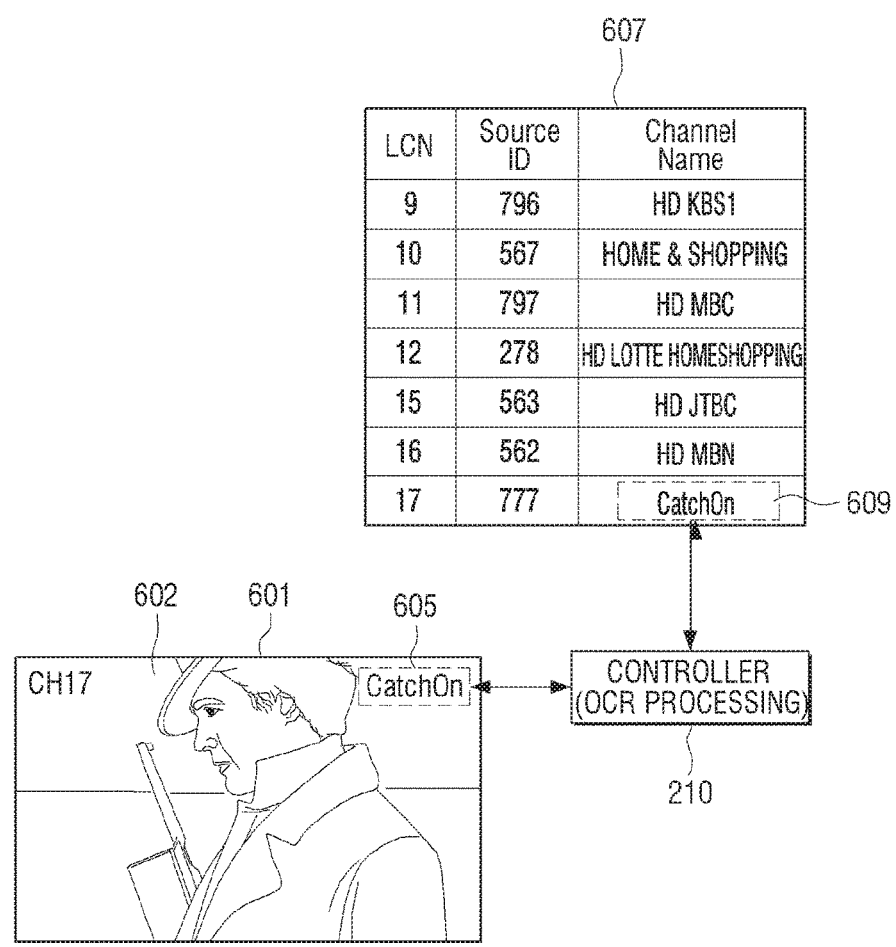
FIG. 6 is a diagram illustrating an example of acquiring a channel name from channel name information displayed on a display of a display apparatus, according to an example embodiment.

FIG. 6 illustrates an example of acquiring a channel name from channel name information displayed on a display.

The channel name information may refer to the channel name displayed on the partial area of content displayed on the display.

FIG. 6 illustrates a display 601, a controller 210 and channel information 607. The channel information 607 may be stored in the display apparatus, and may configure a local channel map. To distinguish the channel map from the channel map stored in the search server, the channel map stored in the display apparatus may be referred to as a local channel map.

When a user changes a channel, the controller 210 may control the display 601 to display content corresponding to the changed channel. The content displayed on the display 601 may include channel name information 605. The channel name information 605 may be a part of content 602, and be displayed in the form of watermark.

When a user input for changing a channel is input, the controller 210 may perform an image-processing of the channel name information 605 displayed on the display 605 and acquire channel name 609. Specifically, the controller 210 may obtain the area in which the channel name information 605 is displayed from the frame of content displayed on the display by image-processing, and process the image of the obtained area by optical character recognition (OCR) and acquire the channel name 609.

The controller 210 may update the channel information 607 using the acquired channel name 609, and transmit the channel information 607 to an event server or a search server.

The controller 210 may receive a user input to obtain the area in which the channel name information 605 is displayed, depending on the implementation. For example, the controller 210 may display a quadrilateral cursor which is for assigning the area on the display, move the quadrilateral cursor according to a user input, and assign the area for obtaining the channel name information 605.

Figure 7:
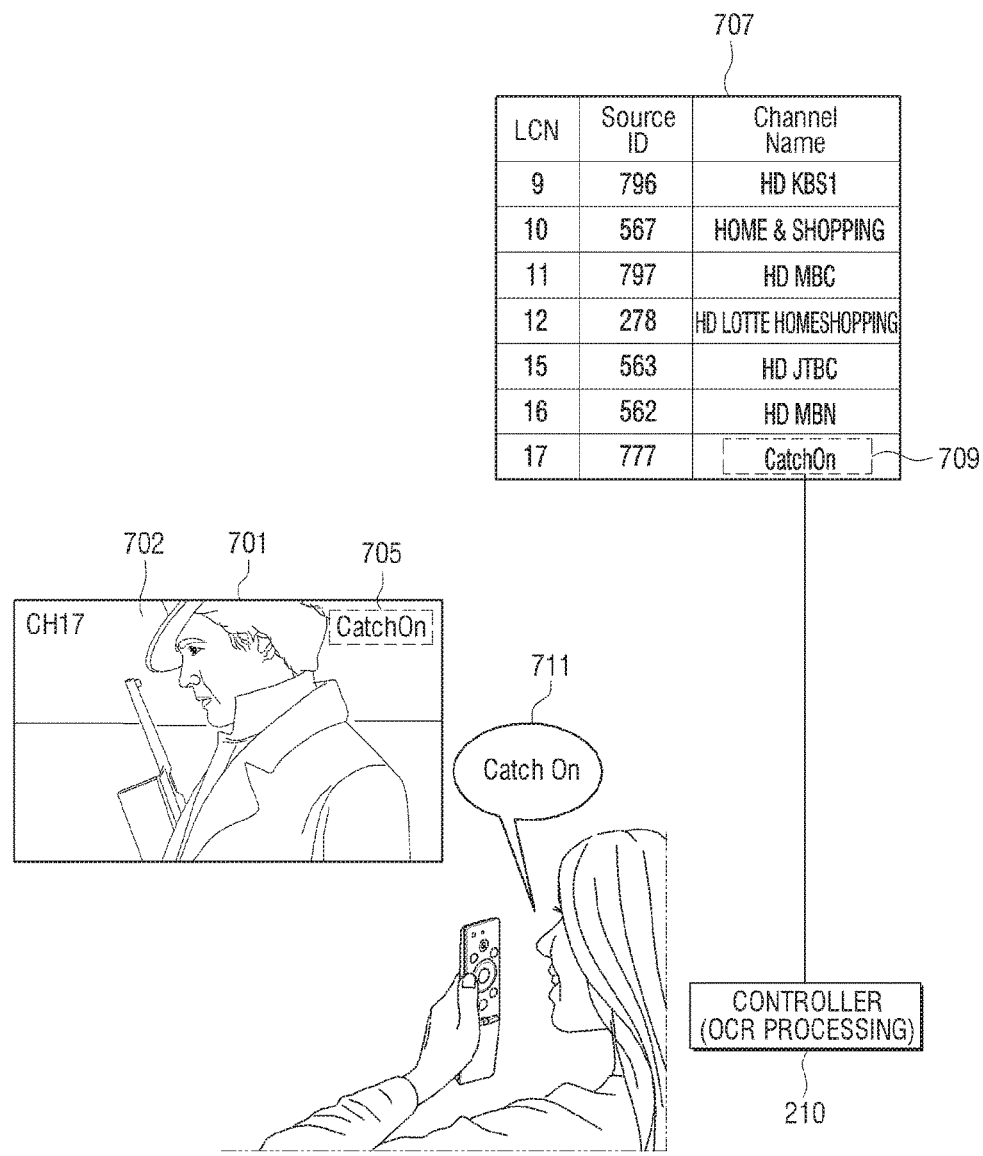
FIG. 7 is a diagram illustrating an example of acquiring a channel name based on a user input in a display apparatus, according to an example embodiment.

FIG. 7 illustrates an example of acquiring a channel name based on a user input in a display apparatus.

In FIG. 7, a display 701, the controller 210 and channel information 707 are illustrated.

When a user changes a channel, the controller 210 may control the display 701 to display the content corresponding to the changed channel. On the content 702 displayed on the display 701, the channel name information 607 may be displayed. The channel name information 705 may be a part of the content 702, and be displayed in the form of watermark.

When a user input for changing a channel is received, the controller 210 may change a channel, and display a message requesting an input of a channel name on the display 701 or may request an input of a channel name by voice.

When a user inputs the channel name 711 through a button provided on a remote controller or by utterance, the controller 210 may update the channel information 707 to the channel name 709 that the user is input.

For example, when a user utters 'Catch On,' the controller 210 may process the voice uttered by the user and acquire the channel name 709, and update channel information using the channel name 709.

Figure 8:
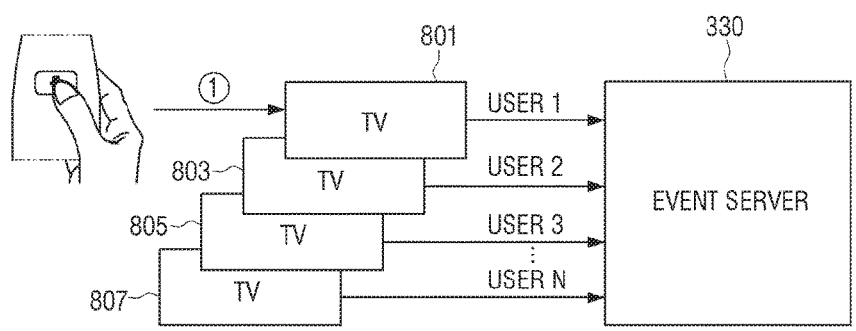
FIG. 8 is a diagram illustrating an example in which an event server receives channel information from a plurality of display apparatuses, according to an example embodiment.

FIG. 8 illustrates an example in which an event server receives channel information from a plurality of display apparatuses.

In FIG. 8, a plurality of display apparatuses 801, 803, 805 and 807 and an event server 330 are illustrated.

The display apparatus may be, for example, a TV.

The event which is generated as 'user 1' uses the display apparatus 801 may be transmitted to the event server 330 through a communicator. For example, when 'user 1' changes a channel, channel information may be transmitted to the event server 330.

The event which is generated as 'user 2' uses the display apparatus 803 may be transmitted to the event server 330 through the communicator. For example, when 'user 2' changes a channel, channel information may be transmitted to the event server 330.

The event which is generated as 'user 3' uses the display apparatus 805 may be transmitted to the event server 330 through the communicator. For example, when 'user 3' changes a channel, channel information may be transmitted to the event server 330.

The event which is generated as 'user N' uses the display apparatus 807 may be transmitted to the event server 330 through the communicator. For example, when 'user 1' changes a channel, channel information may be transmitted to the event server 330.

As described above, the event server 330 may receive event information as well as channel information from the display apparatuses 801, 803, 805 and 807 which a plurality of users use, and store the information. Also, the event server 330 may transmit the channel information including a channel name to a search server.

According to an example embodiment, the event server 330 may be included in a search server. In this case, the search server may receive channel information from the plurality of display apparatuses 801, 803, 805 and 807.

FIG. 9 illustrates an example of channel information which an event server receives.

Referring to FIG. 9, channel information 900 may include a device ID 901 (a device unique ID [DUID]), a local ID 903 ([HeadendID]), a receiving date 907 ([Data-Time]), a channel number 909, a source ID 911 and a channel name 913.

The device ID 901 may be a unique ID provided to a display apparatus, and be used as the information for classifying a display apparatus.

The local ID 903 is a unique ID assigned to a service provider and the region in which a service is provided. The local ID 903 may classify broadcast information provided to a user.

The channel number 909 (the local channel number) may be different in each region even if the channel name is the same.

The source ID 911 may be a unique ID assigned to a broadcasting station. When a display apparatus changes a channel, the display apparatus may search for the source ID 911 corresponding to a channel number or a channel name, and change a channel using the source ID 911.

The channel name 913 may be a part of content displayed on the display, and the channel name 913 may be acquired by image-processing the channel name information displayed on a partial area of a display or by a user input.

The channel name 913 may also be acquired from EPG information.

The channel information 900 may be received from a plurality of display apparatuses. For example, the channel information 900 may be received from the display apparatuses of 'user 1,' 'user 2,' and 'user 3.'

Figure 10:
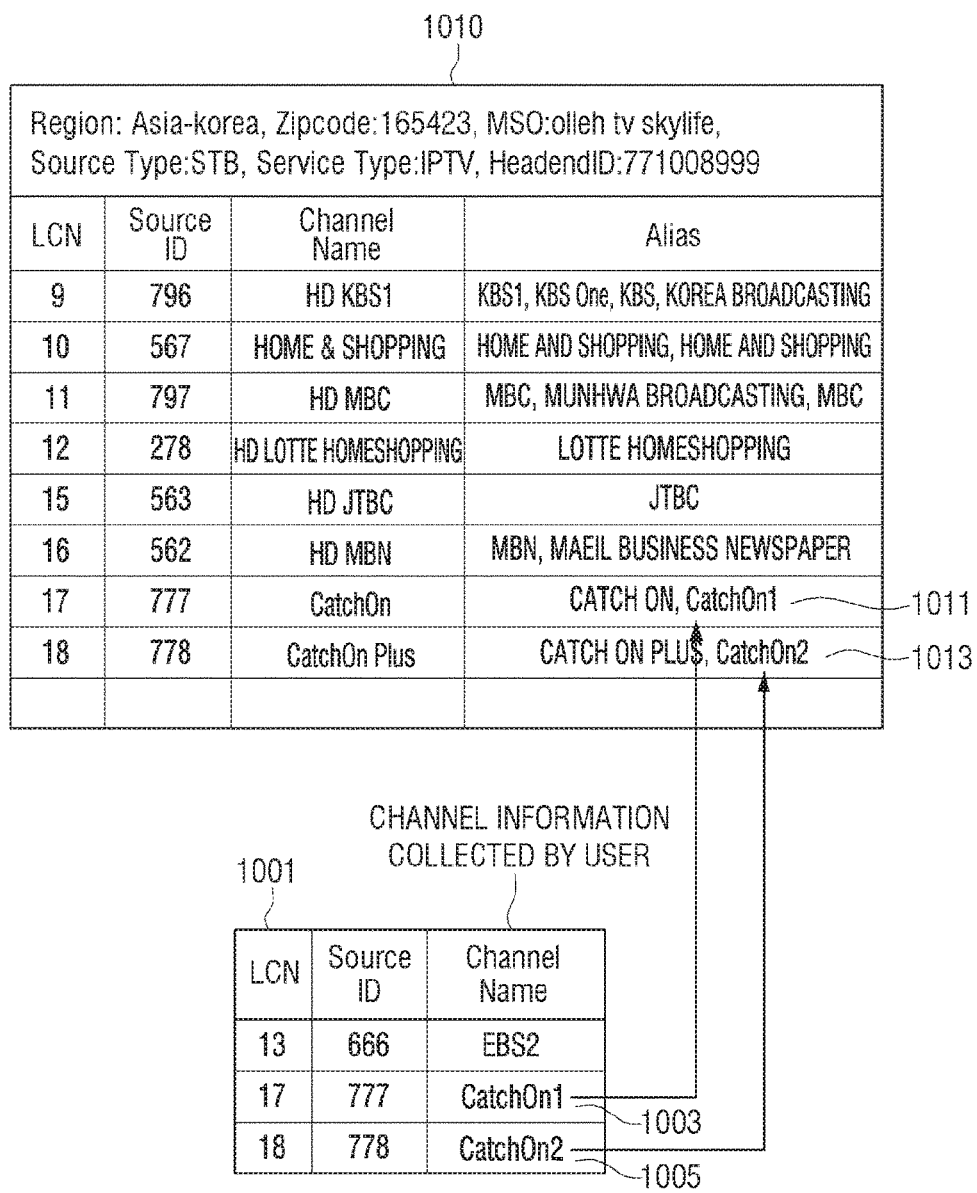
FIG. 10 is a diagram illustrating an example of updating an alias included in a channel map using channel information acquired from a display apparatus, according to an example embodiment.

FIG. 10 illustrates an example of updating an alias included in a channel map using channel information acquired from a display apparatus.

In FIG. 10, channel information 1001 and a channel map 1010 are illustrated.

The channel information 1001 may be transmitted from a display apparatus of a user. The search server may receive the channel information 1001 through an event server. The search server may directly receive the channel information 1001 from the display apparatus without passing through the event server, depending on the implementation.

The channel map 1010 may be stored in the search server.

For example, when a user changes a channel to 'channel number 17' or 'channel number 18,' the channel information 1001 may be generated.

The display apparatus may perform an image-processing of the content of channel 17 which is displayed on a screen, and acquire the channel name of 'channel number 17,' that is, 'Catch On 1' 1003.

The display apparatus may perform an image-processing of the content of channel 18 which is displayed on the screen and acquire the channel name of 'channel number 18,' that is, 'Catch On 2' 1005.

The search server may receive the channel information 1001 transmitted from the display apparatus, and search the channel map 1010 stored in the search server to check whether the same source ID is present using the source ID included in the channel information 1001. If the same source ID is retrieved as the result of the search, the search server may compare the second channel name included in the channel map and the channel name included in the channel information. If the second channel name is not the same as the channel name, the channel name may be added to the aliases.

For example, the search server may search the channel map 1010 using the source ID '777' included in the channel information 1001, and if the search is successful, the search server may compare the second channel name 'Catch On' included in the channel map 1010 with the channel name 'Catch On 1' 1003 included in the channel information 1001. As the second channel name is not the same as the channel name, the search server may add 'Catch On 1' 1011 to the aliases in the channel map 1010.

As another example, the search server may search the channel map 1010 using the source ID '778' included in the channel information 1001, and if the search is successful, the search server may compare the channel name 'Catch On Plus' included in the channel map 1010 with 'Catch On 2' 1005 included in the channel information 1001. As the channel names are not identical, the search server may add 'Catch On 2' 1013 to the aliases in the channel map 1010.

Figure 11:
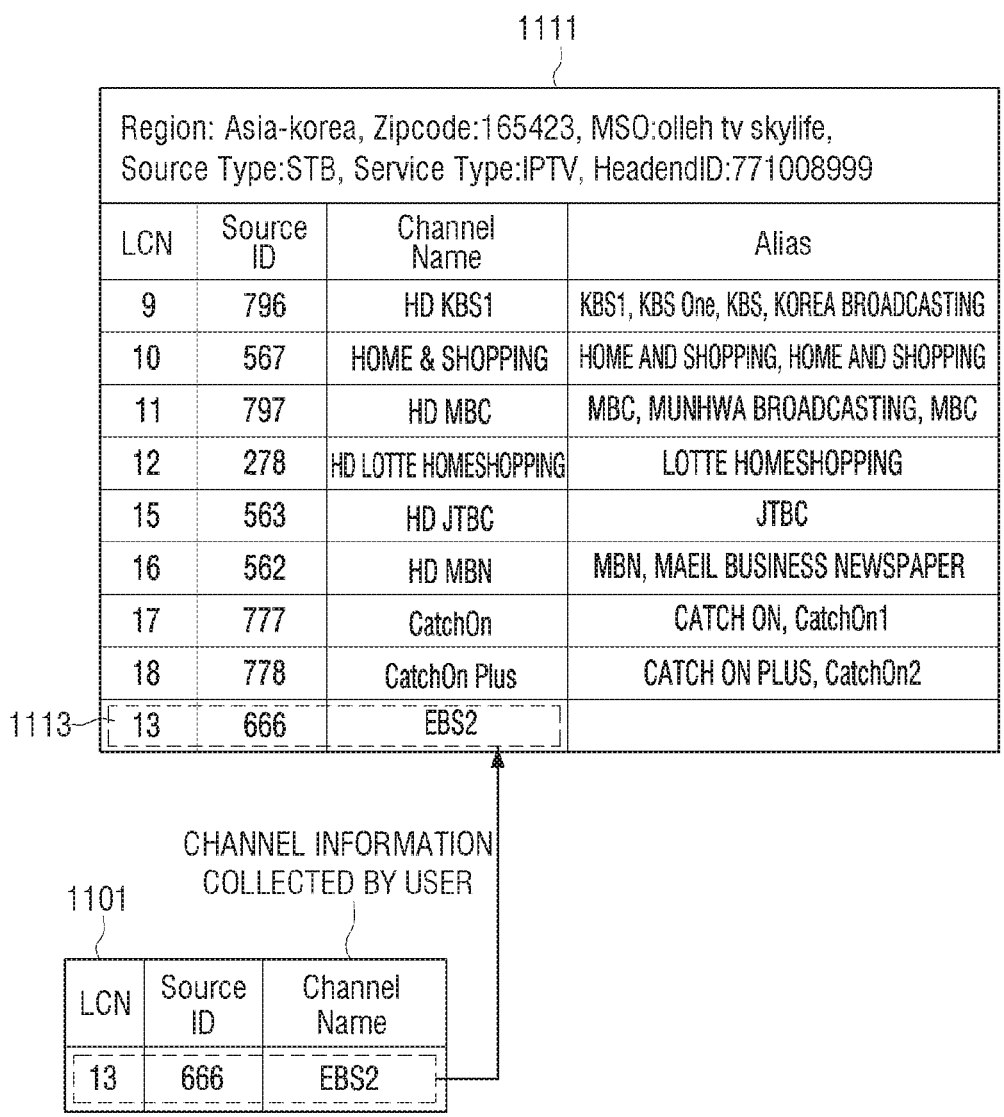
FIG. 11 is a diagram illustrating an example of adding channel information acquired from a display apparatus to a channel map, according to an example embodiment.

FIG. 11 illustrates an example of adding channel information acquired from a display apparatus to a channel map.

In FIG. 11, the channel information 1101 and the channel map 1111 are illustrated.

The channel information 1101 may be transmitted from a display apparatus of a user. The search server may receive the channel information 1101 through an event server. The search server may directly receive the channel information 1101 from the display apparatus, depending on the implementation.

The channel map 111 may be stored in the search server.

For example, when a user changes a channel to 'channel number 13' in the display apparatus, the channel information 1101 may be generated. The channel name of 'channel number 13' may be 'EBS2,' and the channel name may be acquired by an image-processing of the content displayed on a screen.

When the search server receives the channel information 1101 transmitted from the display apparatus, the search server searches the channel map 1111 stored in the search server to check whether the same source ID is present using the source ID included in the channel information 1101.

If the same source ID is not retrieved as the result of the search, the search server may add the channel number, the source ID and the channel name which are included in the channel information 1101 to the channel map 1111.

For example, the search server may search the channel map 1111 using the source ID '666' included in the channel information 1101, but if the same source ID is not retrieved, the search server may add the channel number '13,' the source ID '666,' and the channel name 'EBS2' to the channel map 1111. The channel name 'EBS2' may be added as the second channel name in the channel map. In other words, a new second channel name 1113 may be generated in the channel map.

Figure 12:
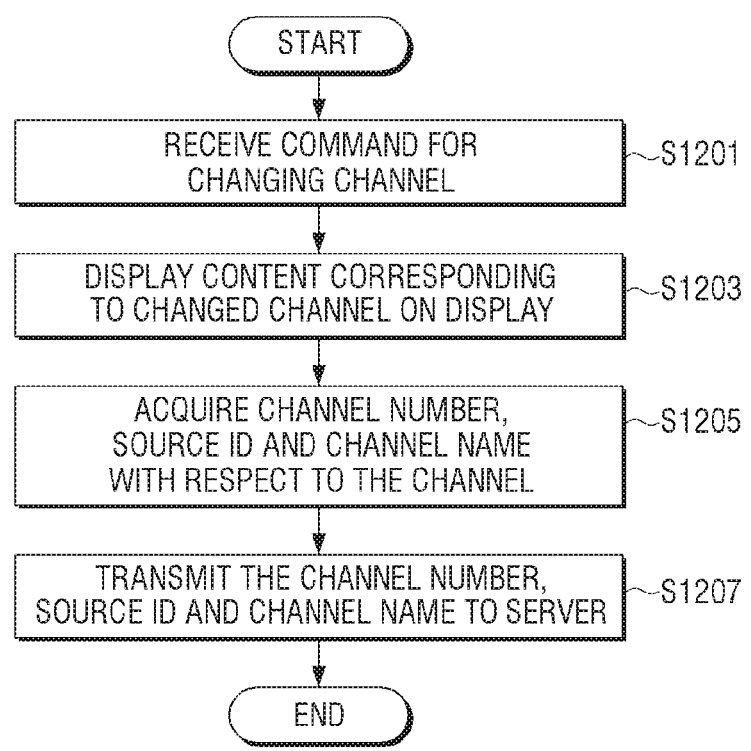
FIG. 12 is a flowchart illustrating a method for collecting channel information and transmitting the collected channel information to a server, according to an example embodiment.

FIG. 12 is a flowchart illustrating a method for collecting channel information and transmitting the information to a server in a display apparatus.

Referring to FIG. 12, a display apparatus may receive a user input for changing a channel (operation S1201). A user may change a channel by uttering a channel name or inputting a channel number.

The display apparatus may display content corresponding to the changed channel on a display (operation S1203). The display apparatus may control a tuner to have the tuning frequency which corresponds to the channel number and receive a broadcast signal, and obtain content from the broadcast signal and display the content on the display.

The display apparatus may acquire a channel number, a source ID and a channel name in relation to the above channel (operation S1205).

The channel name may be acquired based on a user input or by the image-processing of the channel name information displayed on a partial area of the content.

Meanwhile, the display apparatus may acquire a channel number, a source ID and a channel name from the broadcast signal received through the tuner. The channel name may be obtained from the broadcast signal, but as the channel name included in the broadcast signal may not be exact, the display apparatus may transmit to the server the channel name acquired by a user input or by the image-processing of the channel name information displayed on the partial area of the content.

The display apparatus may transmit the channel number, the source ID and the channel name to the server (operation S1207). When a user changes a channel, the display apparatus may automatically transmit to the server the channel number, the source ID and the channel name which are acquired by going through the above process.

Figure 13:
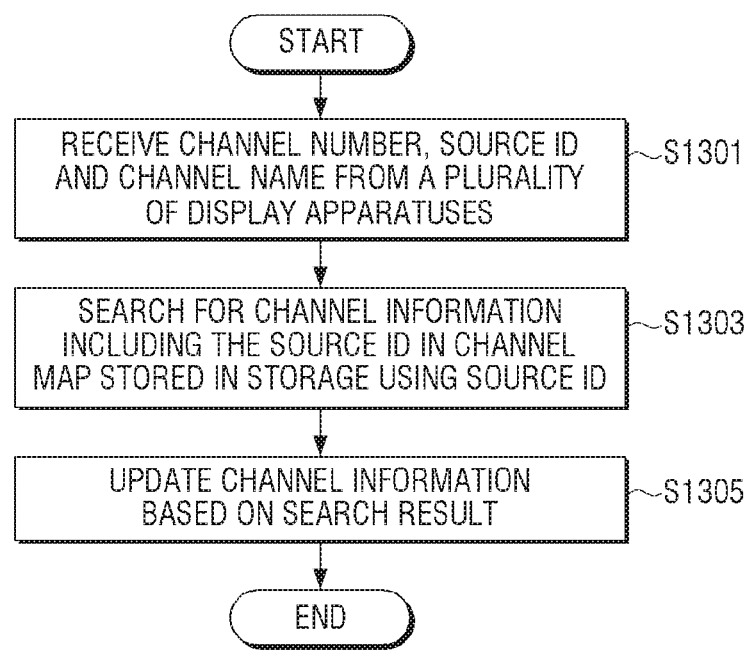
FIG. 13 is a flowchart illustrating a method for updating a channel map after receiving a channel number, a source ID and a channel name from a plurality of display apparatuses in a server, according to an example embodiment.

FIG. 13 is a flowchart illustrating a method for receiving a channel number, a source ID and a channel name and updating a channel map with the received information.

Referring to FIG. 13, a server may receive a channel number, a source ID and a channel name from a plurality of display apparatuses (operation S1301). For example, if a user changes a channel while using the display apparatus, an event may be generated, and the display apparatus may transmit a channel number, a source ID and a channel name to the server.

The server may search for the channel information including the source ID in a channel map stored in a storage using the source ID (operation S1303). As illustrated in FIG. 5, the channel map may include a second channel number, a second source ID and a second channel name and an alias. The alias may include various forms of channel names transmitted from the display apparatus.

If the channel information including the source ID is retrieved, the server may compare the channel name transmitted from the display apparatus with the second channel name stored in the channel map.

The server may update the channel information based on the search result (operation S1305). For example, if the channel name is different from the second channel name, the server may add the channel name to the aliases. The operation has been described above with reference to FIG. 10, and thus, the detailed description thereof will not be repeated.

If the channel information including the source ID is not retrieved, the server may add the received channel number, source ID and channel name to the channel map. The operation has been described above with reference to FIG. 11, and thus, the detailed description thereof will not be repeated.

The methods according to one or more example embodiments may be implemented as a program command type that may be performed through various computer units and may be recorded in a computer readable medium. The computer-readable medium may include program commands, data files, and data structures either alone or in combination. For example, the computer-readable medium may be stored in a volatile or non-volatile storage device such as a ROM, a memory such as a RAM, a memory chip, and a device or an integrated circuit, or a storage medium which may be read with a machine (e.g., computer processing unit (CPU)) simultaneously with being optically or magnetically recorded like a CD, a DVD, a magnetic disk, a magnetic tape, or the like, regardless of whether it is deleted or again recorded. The memory which may be included in a mobile terminal may be one example of a storage medium which may be read with programs including instructions implementing the example embodiments of the present disclosure or a machine appropriate to store the programs. The program commands recorded in the computer-readable medium may be designed for the example embodiments or be known to those skilled in a field of computer software.

The foregoing example embodiments and advantages are merely examples and are not to be construed as limiting the example embodiments. The description of the example embodiments is intended to be illustrative, and not to limit the scope of the inventive concept, as defined by the appended claims, and many alternatives, modifications, and variations will be apparent to those skilled in the art.

What is claimed is:

1. A method for obtaining channel information of a display apparatus, the method comprising:
  based on receiving a user command for selecting a channel, displaying content received through the channel;
  obtaining a first source identification (ID) and a first channel name corresponding to the channel;
  obtaining a second source ID and a second channel name from a local channel map;
  comparing the first source ID and the second source ID;
  based on the first source ID being not equal to the second source ID, adding the first source ID and the first channel name to the local channel map;
  based on the first source ID being equal to the second source ID, comparing the first channel name to the second channel name; and
  based on the first channel name being different than the second channel name, adding the first channel name as other name of the second channel name stored in the local channel map.

2. The method of claim 1, wherein the first channel name is obtained based on a user command.

3. The method of claim 1, wherein the first channel name is obtained by image-processing of channel name information that is displayed on an area of the content.

4. The method of claim 1, wherein the obtaining the first source ID comprises obtaining the first source ID from a broadcast signal received through a tuner.

5. The method of claim 1, wherein the local channel map comprises a second channel number corresponding to the second source ID.

6. A method for updating channel information of a server, the method comprising:
  based on receiving a first source identification (ID) and a first channel name from a display apparatus, searching for channel information including the first source ID in a channel map stored in a memory;
  receiving a second source ID and a second channel name from the channel map;
  comparing the first source ID and the second source ID;
  based on the first source ID being not equal to the second source ID, adding the first source ID and the first channel name to the channel map;
  based on the first source ID being equal to the second source ID, comparing the first channel name to the second channel name; and based on the first channel name being different than the second channel name, adding the first channel name as other name of the second channel name stored in the channel map.

7. The method of claim 6, wherein the channel map comprises a second channel number corresponding to the second source ID.

8. The method of claim 7, further comprising:
adding a first channel number, the first source ID, and the first channel name to the channel map based on the channel information including the first source ID not being retrieved.

9. A display apparatus comprising:
an input interface;
a tuner;
a display;
a memory storing channel information obtained from a broadcast signal; and
a controller configured to:
   control the display to display a content included in the broadcast signal received by the tuner;
   select a channel based on a user command received by the input interface;
   control the display to display the content received through the channel;
   obtain a first source identification (ID) and a first channel name corresponding to the channel;
   obtain a second source ID and a second channel name from a local channel map;
   compare the first source ID and the second source ID;
   based on the first source ID being not equal to the second source ID, add the first source ID and the first channel name to the local channel map;
   based on the first source ID being equal to the second source ID, compare the first channel name to the second channel name; and
   based on the first channel name being different than the second channel name, add the first channel name as other name of the second channel name stored in the local channel map.

10. The display apparatus of claim 9, wherein the controller is further configured to obtain the first channel name based on the user command.

11. The display apparatus of claim 9, wherein the controller is further configured to obtain the first channel name by image-processing of channel name information that is displayed on an area of the content.

12. The display apparatus of claim 9, wherein the local channel map comprises a second channel number corresponding to the second source ID.

* * * * *